G. H. GRIMM, DEC'D.
H. W. VAUGHAN, EXECUTOR.
EVAPORATOR.
APPLICATION FILED AUG. 14, 1914.
1,159,213.
Patented Nov. 2, 1915.
2 SHEETS—SHEET 1.
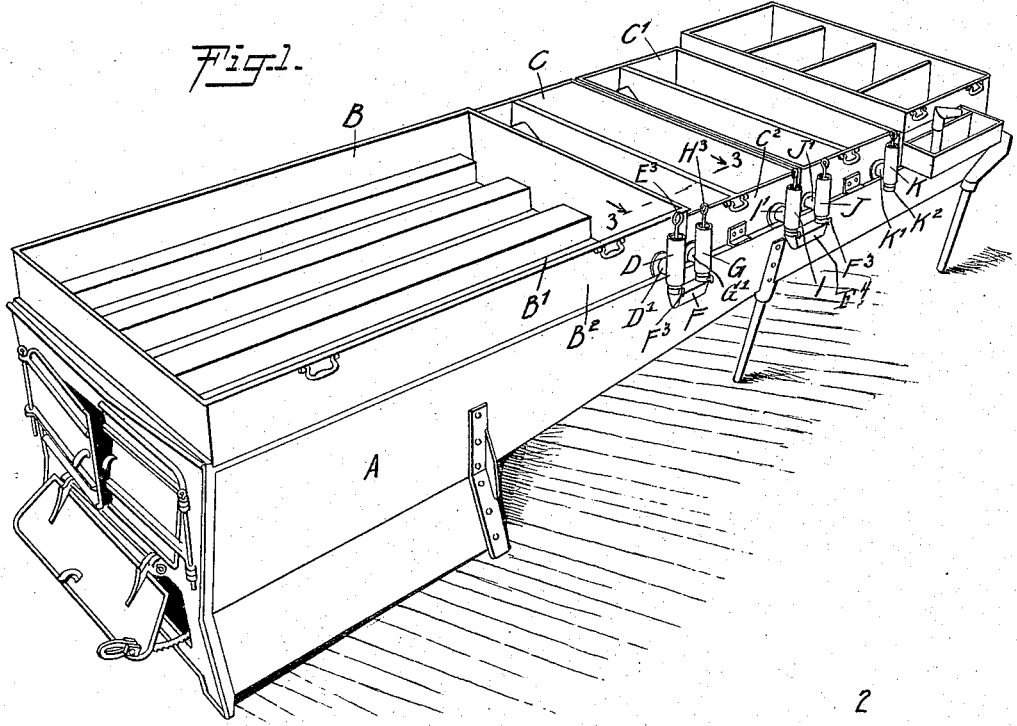
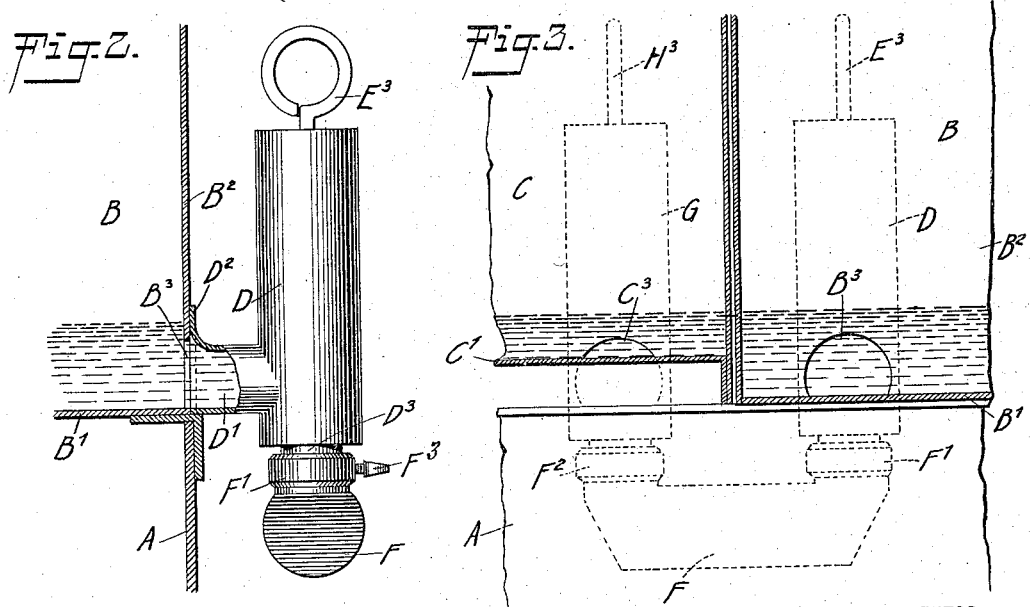
WITNESSES
INVENTOR
Gustave H. Grimm
BY
ATTORNEYS

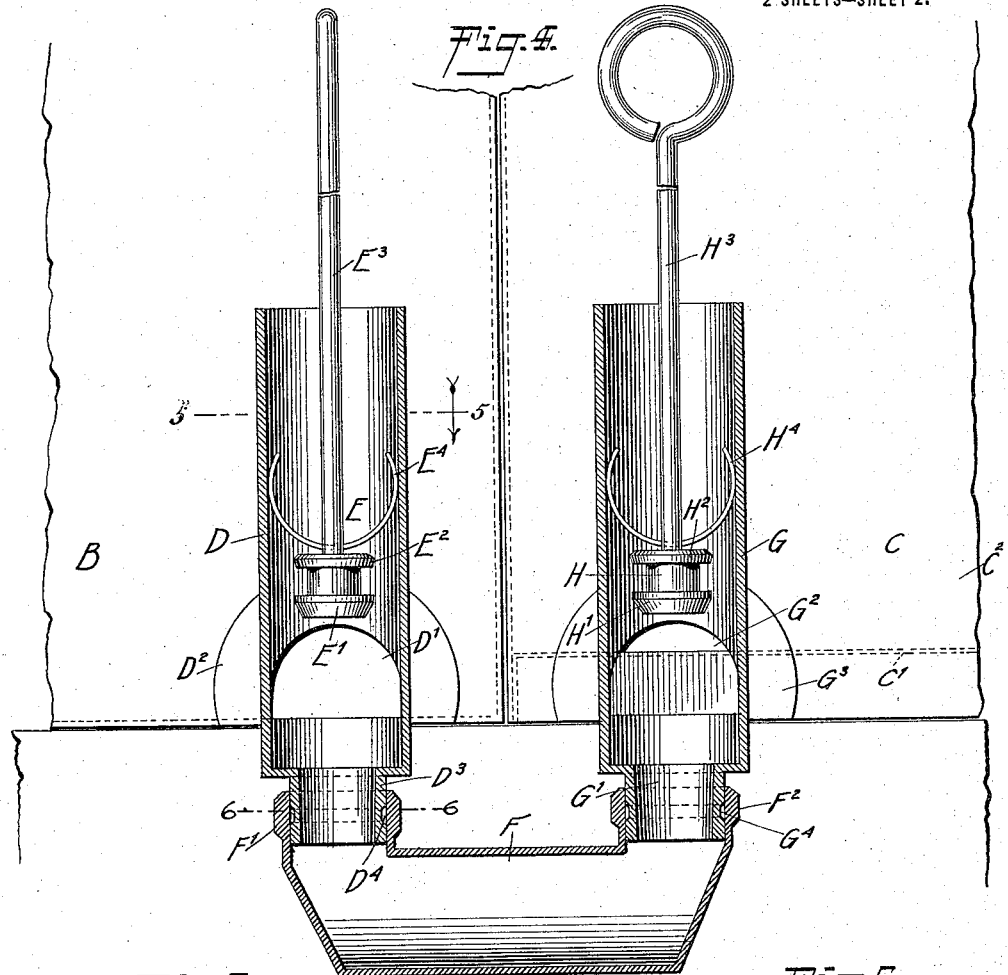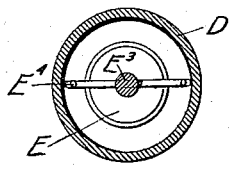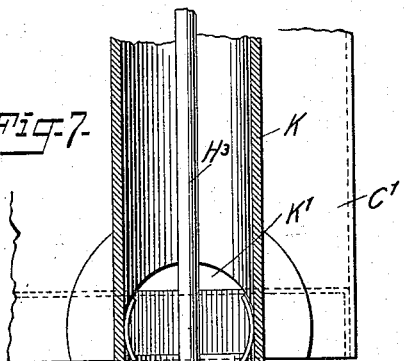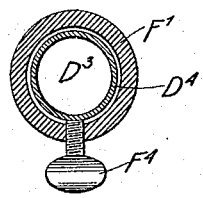

UNITED STATES PATENT OFFICE.

GUSTAVE HENRY GRIMM, OF RUTLAND, VERMONT; HERMAN W. VAUGHAN EXECUTOR OF GUSTAVE H. GRIMM, DECEASED.

EVAPORATOR.

1,159,213. Specification of Letters Patent. Patented Nov. 2, 1915.

Application filed August 14, 1914. Serial No. 856,775.

*To all whom it may concern:*

Be it known that I, GUSTAVE H. GRIMM, a citizen of the United States, and a resident of Rutland, in the county of Rutland and State of Vermont, have invented a new and Improved Evaporator, of which the following is a full, clear, and exact description.

The invention relates to evaporators for use in the manufacture of maple sugar, sorghum, fruit jellies and other food products.

The object of the invention is to provide a new and improved evaporator arranged to permit convenient regulation of the flow of the liquid from one pan, to another, to prevent scum from passing from one pan into the next following one, and to allow a ready interchange of the last finishing pan with the preceding pan to cause the removal of malate of lime deposited on and adhering to the bottom of the finishing pan.

In order to accomplish the desired result, use is made of a main reducing or boiling pan, finishing pans and removable couplings connecting the outlet of one pan with the inlet of the next following pan to allow of interchanging the finishing pan and to allow of drawing off the finished product from the last pan.

A practical embodiment of the invention is represented in the accompanying drawings forming a part of this specification, in which similar characters of reference indicate corresponding parts in all the views.

Figure 1 is a perspective view of the evaporator; Fig. 2 is an enlarged cross section of the valved outlet for the main reducing or boiling pan; Fig. 3 is a longitudinal section of the adjacent ends of the main reducing pan and the next following finishing pan, the section being on the line 3—3 of Fig. 1; Fig. 4 is an enlarged sectional side elevation of the valved connection between the main reducing pan and the next following finishing pan; Fig. 5 is a sectional plan view of one of the valves on the line 5—5 of Fig. 4; Fig. 6 is a similar view of one of the nipples and the corresponding end of the coupling engaging the nipple, the section being on the line 6—6 of Fig. 4; and Fig. 7 is a sectional side elevation of the outlet draw-off valve for the last finishing pan with the valve in closed position.

The evaporator in its general construction as shown in Fig. 1 consists of the furnace A on the front end of which is set the main reducing or boiling pan B connected with a suitable source of sap supply, and adjacent the rear end of the pan B are located interchangeable finishing pans C, C' which can be readily interchanged one relative to the other and to the main reducing pan B, as hereinafter more fully explained. The interior construction of the pans B, C and C' is the same as in pans of evaporators of this type so that further description of the same is not deemed necessary, it being sufficient to state that the liquid passed into the main reducing pan B flows backward and forward in a longitudinal direction while the liquid passing into the finishing pans C, C' travels from one side to the other and back again.

The bottoms $C^2$ of the finishing pans C, C' are on a higher level than the bottom B' of the main reducing pan B, as plainly indicated in Figs. 3 and 4, and the main reducing pan B is provided at the side $B^2$ adjacent the bottom B' with an outlet opening $B^3$ (see Figs. 2 and 5) opening into a horizontal branch pipe D' of a vertically disposed valve casing D, the branch pipe D' having a flange $D^2$ soldered or otherwise secured to the outer face of the side $B^2$. The lower end of the valve casing D is provided with a nipple $D^3$ arranged a distance below the branch pipe D' and the outlet opening $B^3$, and the bore of this nipple is preferably made conical to form a valve seat for a valve E mounted to slide up and down in the casing D. The valve E is provided with two valve disks E', $E^2$ both adapted to be seated in the bore of the nipple $D^3$ so as to tightly close the said nipple $D^3$ whenever it is desired to do so. The stem $E^3$ of the valve E extends upward a distance beyond the top of the valve casing D to be within convenient reach of the operator for moving the valve E into an open or a closed position. The stem $E^3$ is provided with a spring E⁴, the free ends of which bear against the inner surface of the valve casing D so as to hold the valve E in open position.

The nipple D³ is adapted to be engaged by one end F′ of a U-shaped hollow coupling F connected at its other end F² with a nipple G′ similar to the nipple D³ and held on the lower end of a valve casing G provided with a transversely extending branch pipe G² having a flange G³ soldered or otherwise secured to the outer face of the side C² of the finishing pan C. In the valve casing G is arranged a valve H similar to the valve E and adapted to be seated in the conical bore of the nipple G′ to close the same. The valve H is provided with two disks H′, H² mounted on a stem H³ extending beyond the upper end of the valve casing G to be within convenient reach of the operator. On the valve stem H³ is secured a spring H⁴ similar to the spring E⁴ to hold the valve H in open position. The upper portion of the branch pipe G² registers with an inlet opening C³ formed in the side C² of the finishing pan C to allow the liquid to flow from the pan B by way of the opening B³, branch pipe D′, casing D, nipple D³, coupling F, nipple G′, casing G, branch pipe G² and opening C³ into the finishing pan C.

By reference to Fig. 3 it will be noticed that the inlet opening C³ is on a level with the outlet opening B³ to prevent any scum that may form in the main reducing pan B from passing into the first finishing pan C. The ends F′ and F² of the coupling F are provided with set screws F³ engaging annular recesses D⁴ and G⁴ formed exteriorly in the nipples D³ and G′. It is understood that when the set screws F³ are unscrewed the coupling F can be readily removed from the nipples D³ and G′, the valves E and H then being in closed position to prevent outflow of the liquid from either pan B or C.

The side C² of the pan C is provided with an outlet opening similar to the opening C³ and connected with the branch pipe I′ of a valve casing I similar in every respect to the valve casing G and likewise containing a valve H under the control of the operator. The lower end of the valve casing I is provided with a nipple I′ similar to the nipple G′ engaged by one end of a hollow coupling F⁴ similar to the coupling F and connected with a nipple on a valve casing J similar to the valve casings I and G, and provided with a branch pipe J′ connected with inlet openings C³ opening into the second finishing tank C′.

The valve casing J contains a valve H the same as above described relative to the valve casing G. It will be noticed that when the valves in the valve casings I and J are opened then the liquid from the pan C can flow by way of the casings I and J and coupling F⁴ into the second finishing pan C′ from which the liquid can be withdrawn periodically or continually, as the case may be, through an outlet opening similar to the opening C³ and connected with a branch pipe K′ of a valve casing K containing a valve H (see Fig. 7) similar to the valve in the casings J, I and G previously described. When the valve in the valve casing K is seated on the nipple K² the outflow of the liquid from the pan C′ is prevented but when the said valve in the casing K is opened the liquid can flow out of the pan C′ by way of the nipple K² to a suitable receptacle arranged below the said nipple.

It is understood that the coupling F⁴ is removably attached to the nipples of the valve casings I and J the same as the coupling F is removably attached to the nipples D³ and G′, and consequently the pans C and C′ can be interchanged after the evaporator has been used for some time. It is understood that this interchange is made at the time the evaporator is not in use and the couplings F and F⁴ are disconnected from the casings D, G and I, J respectively. After the pans C and C′ have been interchanged then the casing J is connected by the coupling F with the casing D and the casing K is connected by the coupling F⁴ with the casing G, while the casing I and its valve form the draw-off means for drawing off the liquid from the last finishing pan which is now the pan C. After the pans C, C′ are interchanged and the evaporator is again used then the liquid in flowing through the now first finishing pan C′ tends to remove the malate of lime deposited on the bottom of this pan during a previous operation and this malate of lime becomes a sediment in the first finishing pan (C′) and is not liable to pass into the last finishing pan owing to the outlet opening of the pan C′ being below the normal level of the liquid in the pan C′. The malate of lime is removed from the pan with the scum, in the usual manner.

It will be noticed that by adjusting the valves E and H in the several valve casings D, G, I, J and K, the flow of the liquid can be regulated to a nicety to insure a proper evaporation of the liquid with a view to produce syrup or other products of a high quality.

It will be noticed that when the pans C, C′ are interchanged as above described, the couplings F and F⁴ can be readily engaged with the corresponding nipples even should there be a slight variation in the positions of the pans on their supports, and the couplings can be readily fastened in position on the nipples on screwing up the set screws. The coupling arrangement provides sufficient flexibility between the coupled-up pans to compensate for the expansion and contraction of the parts without danger of warping or binding the parts.

It is understood that I do not limit myself to the number of finishing pans employed, as only one such pan may be used or more than two, if desired, it being understood, however, that by the use of the valves and the couplings the several pans can be readily connected with each other and the end valve can be used for drawing off the finished product whenever it is desired to do so.

Having thus described my invention, I claim as new and desire to secure by Letters Patent:

1. An evaporator, comprising a main reducing pan, finishing pans, an outlet and an inlet on the pans adjacent abutting sides, a valve casing connected with the outlet and the inlet, a hollow coupling detachably secured to and establishing communication between the valve casing of one pan and the valve casing of the next following pan, and valves in the said valve casings for regulating the flow of the sap from one pan into the next following, for closing the outlet and inlet when the coupling is removed and for using the valved outlet of the last finishing pan for drawing off the finished product.

2. An evaporator, comprising a main reducing pan having an outlet, a finishing pan adjacent the said main reducing pan and having its bottom on a higher level than the bottom of the said main reducing pan, the said finishing pan having an inlet on the level of the said outlet for the said main reducing pan, and a coupling connecting the said outlet with the said inlet.

3. An evaporator, comprising a main reducing pan having an outlet opening in one side, the bottom of the opening being flush with the bottom of the said pan, a valve casing attached to the said pan and into which leads the said outlet opening, the said valve casing having a nipple at a point below the entrance of the said outlet opening, a finishing pan adjacent the said main reducing pan and having a bottom on a higher level than the bottom of the said main reducing pan, the said finishing pan being provided in one side with an inlet opening on the level of the said outlet opening of the said main reducing pan, a valve casing attached to the said finishing pan and into which leads the said inlet opening, the valve casing for the said finishing pan being provided with a nipple at a point below the entrance of the said inlet opening, valve plugs movable in the said casings and adapted to be seated on the corresponding seats, and a U-shaped tubular coupling removably connecting the said nipples with each other.

4. An evaporator, comprising a main reducing pan having an outlet opening in one side, the bottom of the opening being flush with the bottom of the said pan, a valve casing attached to the said pan and into which leads the said outlet opening, the said valve casing having a nipple at a point below the entrance of the said outlet opening, a finishing pan adjacent the said main reducing pan and having a bottom on a higher level than the bottom of the said main reducing pan, the said finishing pan being provided in one side with an inlet opening on the level of the said outlet opening of the said main reducing pan, a valve casing attached to the said finishing pan and into which leads the said inlet opening, the valve casing for the said finishing pan being provided with a nipple at a point below the entrance of the said inlet opening, valve plugs movable in the said casings and adapted to be seated on the corresponding seats, springs held on the said valve plugs and bearing against the inner faces of the said valve casings to hold the valve plugs in position, and a U-shaped tubular coupling removably connecting the said nipples with each other.

5. An evaporator, comprising a main reducing pan having an outlet opening in one side, the bottom of the opening being flush with the bottom of the said pan, a valve casing attached to the said pan and into which leads the said outlet opening, the said valve casing having a nipple at a point below the entrance of the said outlet opening, a finishing pan adjacent the said main reducing pan and having a bottom on a higher level than the bottom of the main reducing pan, the said finishing pan being provided at one side with an inlet opening on the level of the said outlet opening of the main reducing pan, a valve casing attached to the finishing pan and into which leads the said inlet opening, the said valve casing for the finishing pan being provided with a nipple at a point below the entrance of the said inlet opening, the nipples having tapering bores, valve plugs movable in the said valve casings and each having two valve disks adapted to be seated in the corresponding nipples, a U-shaped tubular coupling having its ends fitting the said nipples, and fastening means for removably fastening the coupling ends to the said nipples.

6. An evaporator provided with a finishing pan having two valve casings, each having a coupling nipple, a valve in each casing, and a coupling for removable engagement with either nipple to permit of coupling the pan to another one and to allow of using the uncoupled valve for draw-off purposes.

7. An evaporator provided with a finishing pan having an inlet valve and an outlet valve, each valve having a casing provided at its lower end with a nipple, and each valve having a manually controlled valve plug adapted to be seated on the said nipple, and a spring held on the said valve plug and engaging the inner face of the said casing for holding the valve in an adjusted position.

In testimony whereof I have signed my name to this specification in the presence of two subscribing witnesses.

GUSTAVE HENRY GRIMM.

Witnesses:
GEORGE N. HARMAN,
HENRY A. HARMAN.

Copies of this patent may be obtained for five cents each, by addressing the "Commissioner of Patents, Washington, D. C."